UNITED STATES PATENT OFFICE.

L. OTTO P. MEYER, OF NEWTOWN, CONNECTICUT.

IMPROVEMENT IN PROCESSES FOR THE PRODUCTION OF HARD RUBBER OR VULCANITE WITH CLOTH SURFACE OR SURFACES.

Specification forming part of Letters Patent No. 153,449, dated July 28, 1874; application filed April 24, 1874.

CASE C.

*To all whom it may concern:*

Be it known that I, L. OTTO P. MEYER, of Newtown, county of Fairfield and State of Connecticut, have invented a new Process for the Production of Hard Rubber or Vulcanite with Cloth Surface or Surfaces, of which the following is a specification:

In the manufacture of what is known as hard rubber or vulcanite, prior to my said invention, it has been found impracticable to manufacture acticles of that material, with the surface or surfaces coated with cloth, without injury to the cloth; but by my improved process I can successfully produce vulcanite or vulcanized hard rubber with the surface or surfaces coated with cloth.

My said invention consists in applying to the inner surfaces of the cloth to be used a thin coat or sheet of the compound of india-rubber and sulphur suitable for making, when vulcanized, what is known as soft, flexible, and compressible india-rubber, and then applying, by the well-known process of calendering, to the surface so coated the compound suitable for producing vulcanite or hard rubber, and then subjecting to the required vulcanizing-heat. By the interposition of a thin coat of the soft compound between the cloth and the hard compound, and then submitting to the vulcanizing-heat suitable for producing vulcanite, I am enabled effectually to produce vulcanite with the cloth surface uninjured.

In working my said new process, I apply, by means of calendering-rollers, a thin coat of what is known as the soft compound of india rubber and sulphur, taking care to use this compound. The surface so plated is then applied by pressure to the surface of the hard compound, making the application by calendering-rollers or otherwise, so as to insure perfect contact. And then the parts so united are to be subjected to the vulcanizing heat, as in the process of vulcanizing hard rubber or vulcanite.

When the object is to produce vulcanite with one or both surfaces coated with cloth, presenting a clean surface, before subjecting it to the process of vulcanization, the surface of the cloth must be well rubbed with paraffine or or French chalk; but if the surface of the cloth is not required to be clean, or it is to be interposed between two sheets of hard rubber, then I prefer, before applying the coat of soft compound of india-rubber, to soak the cloth in hot lard-oil, and passing between calendering-rollers so as to squeeze out the oil.

What I claim as my invention, and desire to secure by Letters Patent, is—

The process, substantially as herein described, for producing vulcanite or hard rubber coated with cloth, by the interposition of the soft compound between the cloth and hard compound, preparatory to and in combination with the process of vulcanization, as set forth.

L. OTTO P. MEYER.

Witnesses:
  B. T. VETTERLEIN,
  WM. SCOTT.